United States Patent
Subasic et al.

(10) Patent No.: US 8,249,533 B2
(45) Date of Patent: Aug. 21, 2012

(54) RAPIDLY ADJUSTABLE LOCAL OSCILLATION MODULE AND APPLICATIONS THEREOF

(75) Inventors: Bojan Subasic, Etobicoke (CA); Mathew A. Rybicki, Austin, TX (US)

(73) Assignee: Vixs Systems, Inc., Toronto, Ontario ( * ) Notice: Subject to any disclaimer, the term of this patent is extended or adjusted under 35 U.S.C. 154(b) by 520 days.

(21) Appl. No.: 11/274,367

(22) Filed: Nov. 14, 2005

(65) Prior Publication Data
US 2006/0068721 A1 Mar. 30, 2006

Related U.S. Application Data

(63) Continuation-in-part of application No. 10/741,716, filed on Dec. 19, 2003, now Pat. No. 7,991,379.

(51) Int. Cl.
*H03J 7/32* (2006.01)
(52) U.S. Cl. ............. 455/147; 455/146; 455/150.1; 455/165.1; 455/179.1; 455/196.1; 455/197.1; 455/255; 455/260; 455/265; 455/277.1; 455/318; 455/76; 375/376; 375/344; 375/307; 375/373; 375/375; 327/156; 327/105; 327/47; 327/57; 327/18; 327/175; 327/177; 327/147; 327/117; 327/162; 331/158; 331/175; 331/25; 332/127
(58) Field of Classification Search .............. 455/73, 455/552.1, 260, 258, 188.1, 183.1, 166.2, 455/112, 553.1, 76, 78, 83, 88, 146, 147, 455/150.1, 165.1, 179.1, 196.1, 197.1, 255, 455/265, 277.1, 318; 375/376, 344, 307, 375/373, 375; 327/156, 105, 47, 57, 17, 327/18, 175, 177, 147, 117, 162; 331/158, 331/175, 25; 332/127, 2, 17, 25
See application file for complete search history.

(56) References Cited

U.S. PATENT DOCUMENTS

| | | | | |
|---|---|---|---|---|
| 6,085,075 | A * | 7/2000 | Van Bezooijen | 455/260 |
| 6,658,237 | B1 * | 12/2003 | Rozenblit et al. | 455/83 |
| 6,714,765 | B1 * | 3/2004 | Kimppa | 455/76 |
| 6,754,508 | B1 * | 6/2004 | Pau | 455/552.1 |
| 7,062,239 | B2 * | 6/2006 | Inoue | 455/166.2 |
| 7,274,919 | B2 * | 9/2007 | Hirtzlin et al. | 455/188.1 |

(Continued)

OTHER PUBLICATIONS

Analog Devices, "Low Phase Noise, Fast Settling PLL Frequency Synthesizer" ADF4193 (p. 1-32); One Technology Way, P.O. Box 9106 Norwood, MA 02062-9106 USA.

*Primary Examiner* — Junpeng Chen
(74) *Attorney, Agent, or Firm* — Garlick & Markison; Bruce E. Stuckman

(57) ABSTRACT

A rapidly adjustable local oscillation (LO) module for use in a radio transmitter or a radio receiver includes an oscillation generating module and a high frequency switching module. The oscillation generating module is operably coupled to generate a plurality of local oscillations. The high frequency switching module is operably coupled to, for a first one of a plurality of transmission paths, provide one of the plurality of local oscillations when a first transmission path selection indication is in a first state and provide another one of the plurality of local oscillations when the first transmission path selection indication is in a second state and, for a second one of the plurality of transmission paths, provide the one of the plurality of local oscillations when a second transmission path selection indication is in a first state and provide the another one of the plurality of local oscillations when the second transmission path selection indication is in a second state.

22 Claims, 6 Drawing Sheets

U.S. PATENT DOCUMENTS

| | | | |
|---|---|---|---|
| 2004/0192240 A1* | 9/2004 | Futamura et al. | 455/183.1 |
| 2004/0263378 A1* | 12/2004 | Jossef et al. | 342/20 |
| 2005/0090208 A1* | 4/2005 | Liao | 455/112 |
| 2005/0266806 A1* | 12/2005 | Soe et al. | 455/88 |
| 2006/0019700 A1* | 1/2006 | Seo et al. | 455/553.1 |
| 2006/0057992 A1* | 3/2006 | Chien et al. | 455/258 |
| 2007/0026814 A1* | 2/2007 | Gierkink | 455/73 |
| 2007/0111675 A1* | 5/2007 | Arayashiki et al. | 455/78 |

* cited by examiner

RF transceiver front-end 10 receiver 12a transmitter 14a

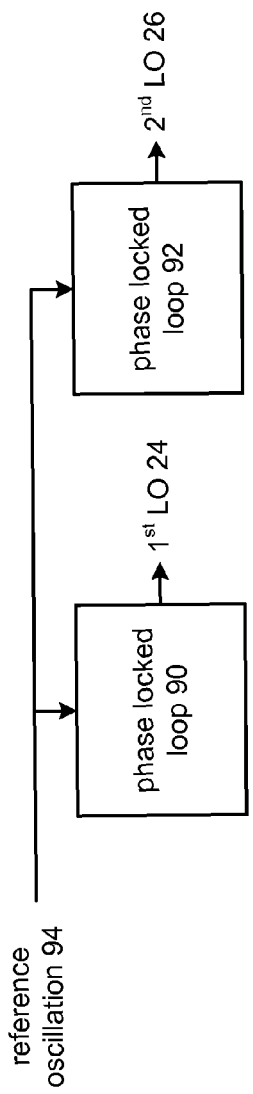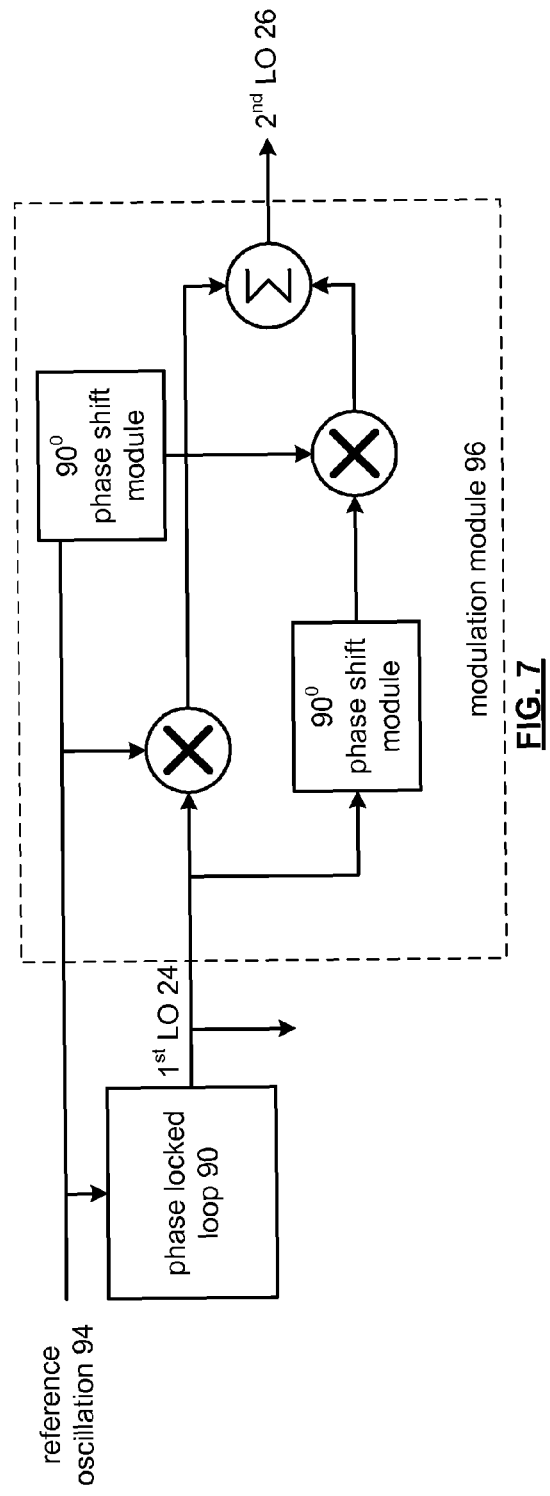

RAPIDLY ADJUSTABLE LOCAL OSCILLATION MODULE AND APPLICATIONS THEREOF

This patent application is claiming priority under 35 USC §120 as a continuation in part patent application of co-pending patent application entitled RF TRANSMITTER AND RECEIVER FRONT-END, having a Ser. No. 10/741,716, and a filing date of Dec. 19, 2003 now U.S. Pat. No. 7,991,379.

BACKGROUND OF THE INVENTION

1. Technical Field of the Invention

This invention relates generally to wireless communication devices and more particularly to local oscillators with a wireless communication device.

2. Description of Related Art

It is well known that a wireless transmission originates at a transmitter of one wireless communication device and ends at the receiver of another wireless communication device. The structure of the wireless transmission is dependent upon the wireless communication standard, or standards, being supported by the wireless communication devices. For example, IEEE 802.11a defines an orthogonal frequency division multiplexing (OFDM) wireless transmission protocol that included eight 20 MHz spaced channels in the lower band (e.g., 5.15 gigahertz to 5.35 gigahertz) and four 20 MHz spaced channels in the upper band (e.g., 5.725 gigahertz to 5.825 gigahertz). Each channel may include 52 sub-carriers, 48 of which carry data based on a sub-carrier modulation mapping. Such sub-carrier modulation mapping includes binary phase shift keying (BPSK), quadrature phase shift keying (QPSK), 16-quadrature amplitude modulation (QAM) or 64-QAM.

Typically, during a wireless transmission, only one channel carries valid data. Accordingly, the receiver tunes its one or more intermediate frequency (IF) stages such that the desired channel is centered within the filter response of the receiver to convert to baseband. As such the desired channel is recaptured as a baseband signal and subsequently decoded in accordance with the sub-carrier modulation mapping to obtain the transmitted data.

If, from one wireless transmission to the next, the channel is changed, the receiver needs to adjust its IF stage, or stages, in particular, change the frequency of the local oscillation, to receive the new channel. With most local oscillation designs, it takes hundreds of micro seconds to thousands of micro seconds to adjust from one local oscillation frequency to another. An improvement on this is disclosed in "Low Phase Noise, Fast Settling PLL Frequency Synthesizer" part number ADF4193 by Analog Devices.

For 802.11a applications, the specification requires channel switching to take less than 1 micro-second. As such, adjusting the local oscillation using conventional technique for channel switching in an 802.11a receiver and/or an 802.11 transmitter is unacceptable. For multiple transmission path communications, the situation is exacerbated and can require channel changes on the order of several micro-seconds.

Therefore, a need exists for a fast multiple transmission path switching local oscillation module for wireless communication devices.

BRIEF DESCRIPTION OF THE SEVERAL VIEWS OF THE DRAWINGS

FIG. 6 is a schematic block diagram of an oscillation generation module in accordance with the present invention; and FIG. 7 is a schematic block diagram of an oscillation generation module in accordance with the present invention.

DETAILED DESCRIPTION OF THE INVENTION

Figure 1:
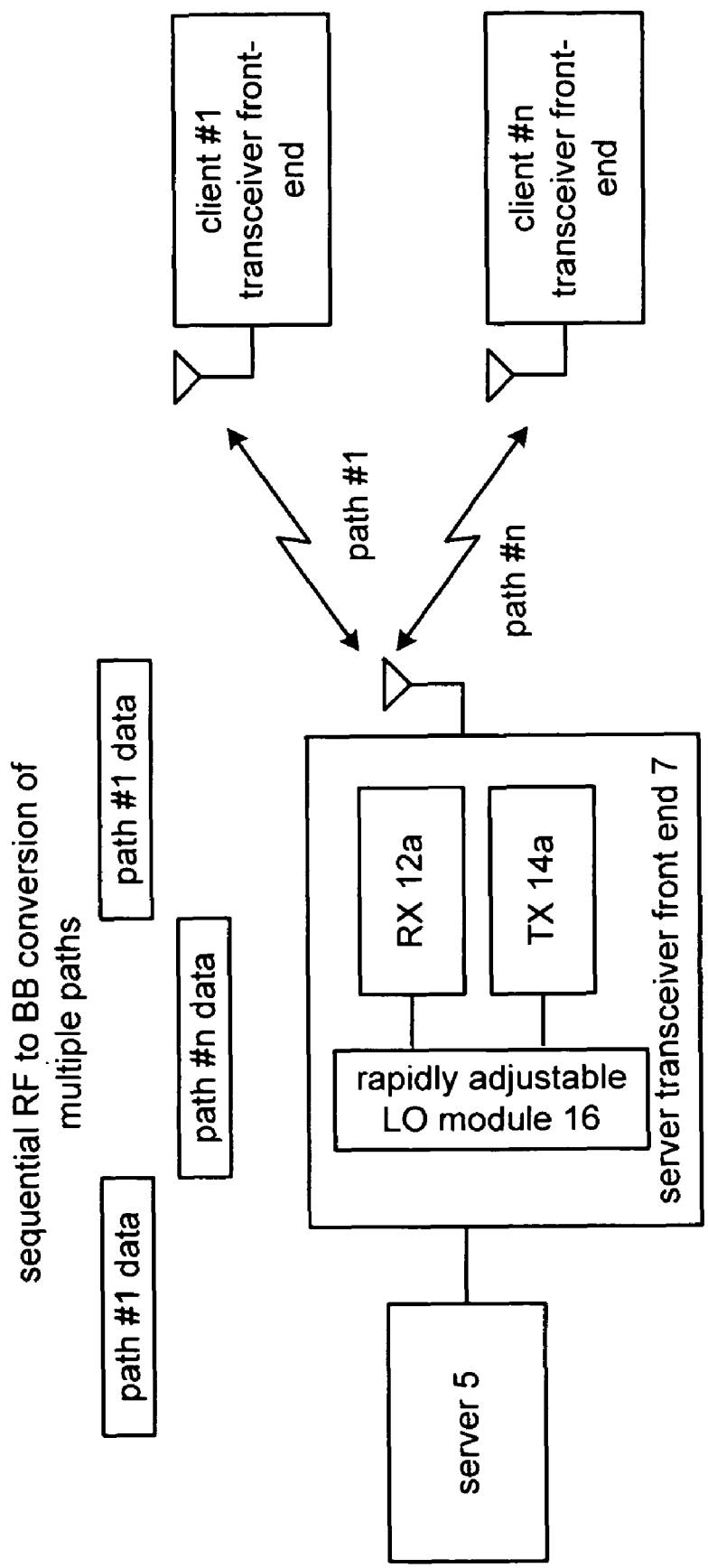
FIG. 1 is a schematic block diagram of a multiple path radio frequency communication in accordance with the present invention.

FIG. 1 is a schematic block diagram of a server 5 communicating wirelessly with a plurality of clients #1-#n. The server 5 is operably coupled to a server transceiver front-end 7, which includes a radio frequency (RF) receiver 12a, an RF transmitter (TX) 14a, and a rapidly adjustable local oscillation (LO) module 16. In this embodiment, the transceiver front-end 7 sequentially and wirelessly communicates with the plurality of clients #1-n via multiple transmission paths (paths #1-#n). In one embodiment, the wireless communication may be in accordance with one or more versions of IEEE 802.11a, b, g or n protocols.

In operation, the server 5, which may be a multimedia server (i.e., a server that provides video, audio, still frame, graphics, and/or text files), may be communicating with one or more clients at any given time. When the server 5 is communicating with a single client, the client is assigned a transmission path (i.e., a channel, a time slot(s) of a channel, or a frequency slot(s) of a channel), and the communication occurs over this path with minimal concern (outside of overhead communications) of communications with other clients.

When the server is communicating with more than one client at a given moment, each client is assigned a separate channel and/or separate time slots of a given channel and the communication is done sequentially. For instance, at a given time, the server 5, via the transceiver front end 7, is communicating with client #1 and the other clients are waiting. In this state, the LO module 16 is providing a local oscillation corresponding to the transmission path on which this communication is supported. When the communication with client #1 is finished (e.g., the time slot(s) has ended, a predetermined period of time has elapsed, transmission of a frame has concluded, or trigger per some other communication sharing protocol has occurred), the server 5, via the transceiver front end 7, communicates with another client (e.g., client #n). The communication with the server is shared among the clients in such a manner as long as more than one client is actively accessing the server. Note that priority accesses may at least temporarily override the communication sharing.

To facilitate, in one embodiment, the change in communication from one client to another, the server transceiver front end 7 rapidly changes the channel to which it is tuned. This is done via the rapidly adjustable LO module 16, which rapidly changes the LO it provides to the receiver 12a and the transmitter 14a. The rapidly adjustable LO module 16 will be described in greater detail with reference FIGS. 3, 6, and 7; the receiver 12a will be described in greater detail with reference to FIG. 4; and the transmitter 14a will be described in greater detail with reference to FIG. 5.

Figure 2:
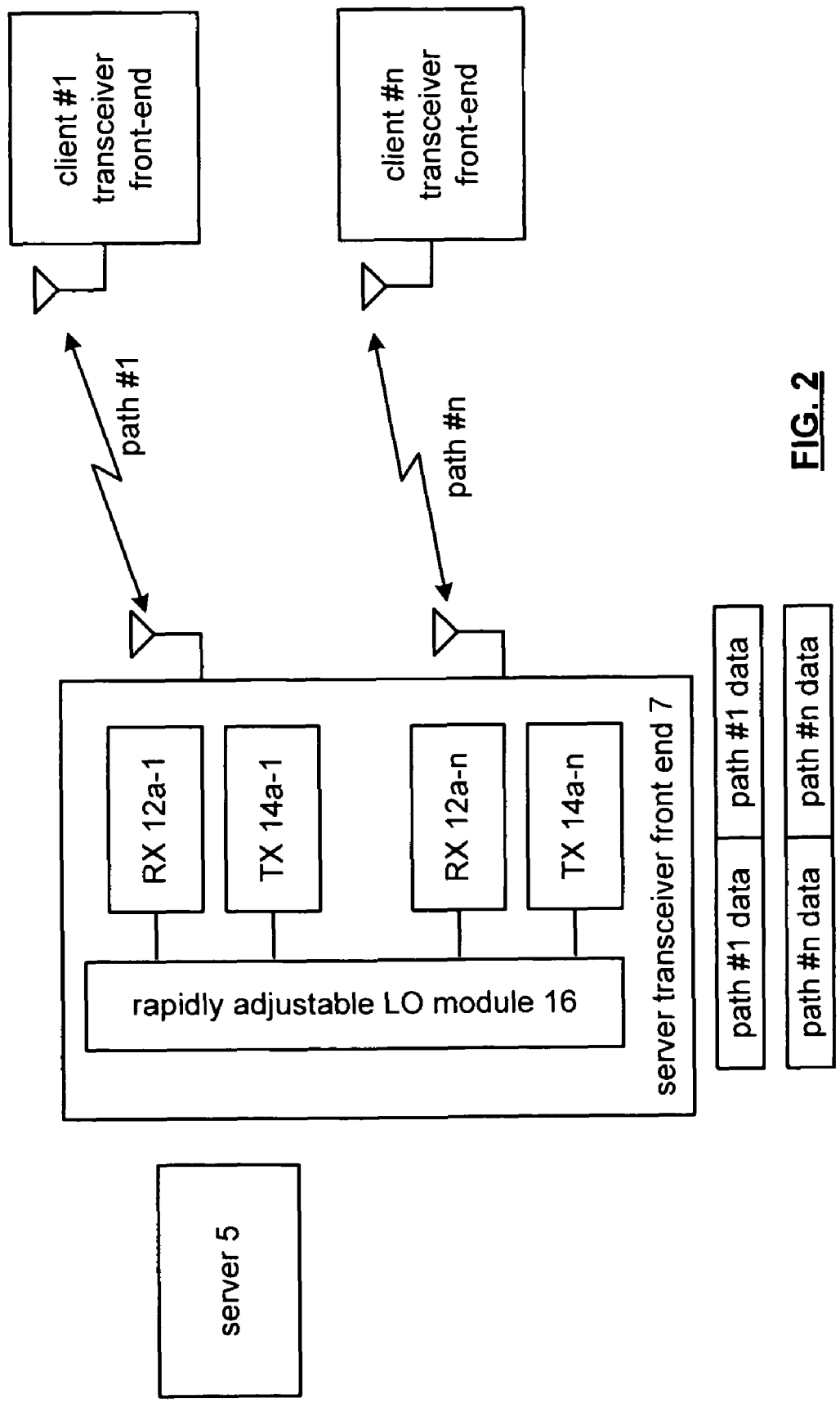
FIG. 2 is a schematic block diagram of another multiple path radio frequency communication in accordance with the present invention.

FIG. 2 is a schematic block diagram of a server 5 communicating wirelessly with a plurality of clients #1-#n. The server 5 is operably coupled to a server transceiver front-end 7, which includes a plurality of radio frequency (RF) receivers 12a-1 through 12a-n, a plurality of RF transmitters (TX) 14a-1 through 14a-n, and a rapidly adjustable local oscillation (LO) module 16. In this embodiment, the transceiver front-end 7 wirelessly communicates in parallel with the plurality of clients #1-n via multiple transmission paths (paths #1-#n). In one embodiment, the wireless communication may be in accordance with one or more versions of IEEE 802.11a, b, g, or n protocols.

In this embodiment, the rapidly adjustable LO module 16 provides a LO oscillation to each of the plurality of receivers 12a and the plurality of transmitters 14a. The LO module 16 rapidly adjusts the LO provided to the receivers 12a and the transmitters 14a based on changes in the transmission paths, which are dictated by the server 5.

Figure 3:
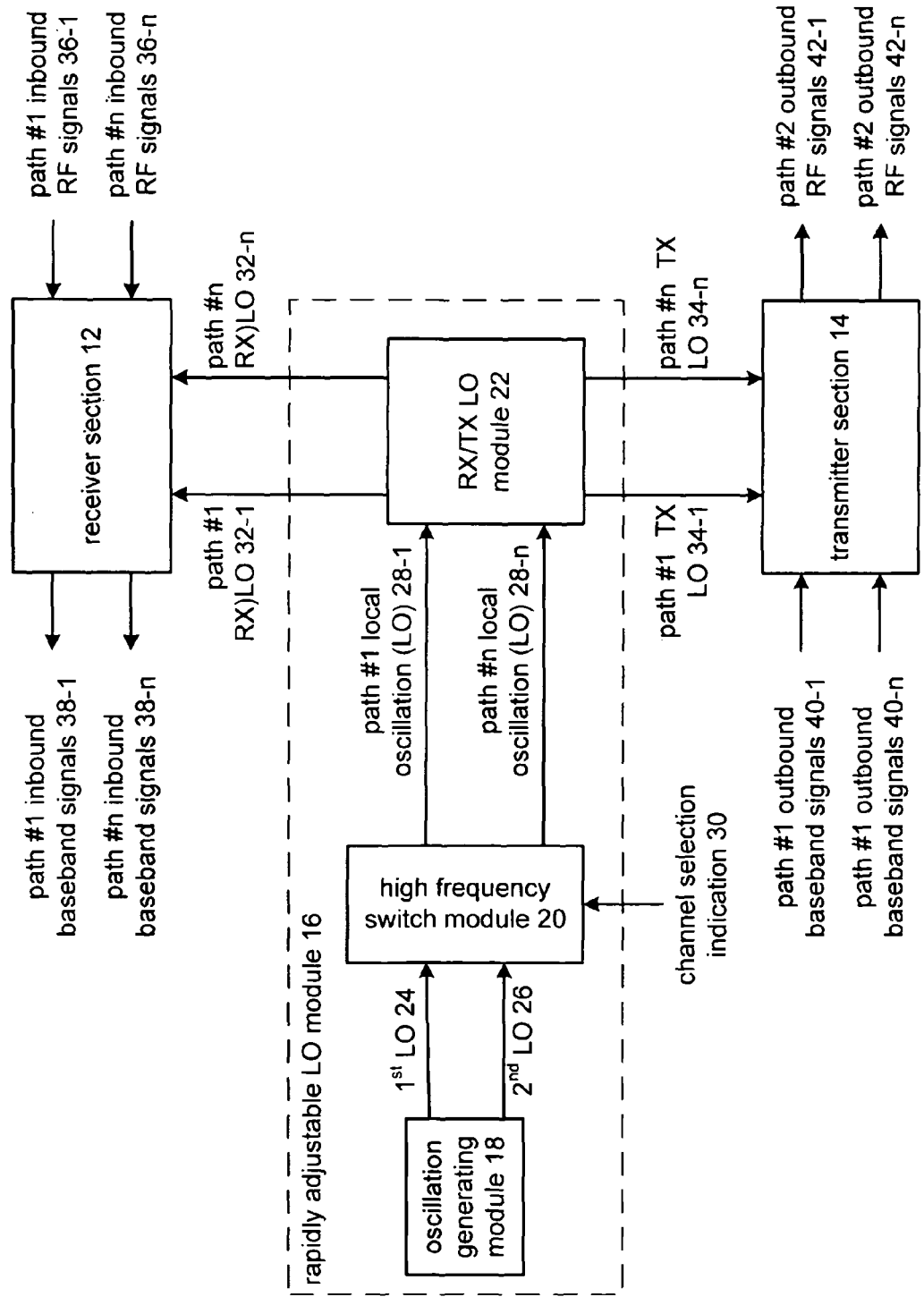
FIG. 3 is a schematic block diagram of a radio frequency front-end in accordance with the present invention.

FIG. 3 is a schematic block diagram of a radio frequency (RF) transceiver front-end 10, which may be used as the server front-end 7 and/or as the client transceiver front end. The RF transceiver front end 10 includes a receiver section 12, a transmitter section 14, and the rapidly adjustable local oscillation (LO) module 16. The rapidly adjustable LO module 16 includes an oscillation generating module 18, a high frequency switch module 20, and a receiver/transmitter (RX/TX) module 22. The receiver section 12 may include one or more receivers 12a and the transmitter section 14 may include one or more transmitters 14a as shown in FIGS. 1 and 2.

In operation, the receiver section 12 converts a plurality of inbound RF signals 36-1 through 36-n (e.g., one per transmission path) into a plurality of inbound baseband signals 38-1 through 38-n based on a plurality of receiver (RX) LOs 32-1 through 32-n. In one embodiment, a receiver 12a, as will be described in greater detail with reference to FIG. 4, includes a low noise amplifier to amplify the inbound RF signals 36 before down converting the RF signals to baseband via one or more intermediate frequency (IF) stages. For each IF stage, the receiver LO 32 includes a corresponding local oscillation. The receiver 12a may further include low pass and/or band pass filtering to produce the inbound baseband signals 38.

The transmitter section 14 converts a plurality of outbound baseband signals 40 (e.g., one for each transmission path) into a plurality of outbound RF signals 42 based on a plurality of transmitter LOs 34-1 through 34-n. In one embodiment, a transmitter 14a, which will be described in greater detail with reference to FIG. 5, includes one or more IF stages to up convert the outbound baseband signals 40 into RF signals in accordance with one of the transmitter (TX) LOs 34. For each IF stage, the transmitter LO 34 includes a corresponding local oscillation. The transmitter 14a further includes a power amplifier to amply the RF signals to produce the outbound RF signals 42.

The rapidly adjustable LO module 16 is operably coupled to produce the one or more receiver LO 32 and the one or more transmitter LO 34 that may be rapidly adjusted such that the transmitter section 14 and/or receiver section 12 may switch from channel to channel in accordance with a tight specification (e.g., 1 micro-second for IEEE 802.11a). To generate the local oscillations 32 and 34, the oscillation generating module 18, which will be described in greater detail with reference to FIGS. 6 and 7, generates a plurality of local oscillations (e.g., a $1^{st}$ local oscillation 24 and a $2^{nd}$ local oscillation 26). In one embodiment, the receiver LO 32 and transmitter LO 34 are derived from the st LO 24 for a first channel and derived from the $2^{nd}$ LO 26 for a second channel.

For each transmission path, the high frequency switch module 20 passes either the $1^{st}$ or the $2^{nd}$ LO 24 or 26 as a local oscillation (LO) 28 to the RX/TX LO module 22 based on a channel selection indication 30. For example, when the channel selection indication 30 indicates the first channel, the high frequency switch module 20 passes the $1^{st}$ LO 24 as the LO 28 and when the channel selection indication 30 indicates the second channel, the high frequency switch module 20 passes the $2^{nd}$ LO 26 as the LO 28. In one embodiment, the high frequency switch module 20 includes at least one commercially available high frequency switch that operates in the 2 gigahertz to 5 gigahertz range.

The RX/TX module 22 converts the local oscillation 28 into the one or more receiver LO 32 and transmitter LO 34. In one embodiment, RX/TX module 22 includes a first buffer and a second buffer, where the first buffer buffers the LO 28 to produce the receiver LO 32 and the second buffer buffers the LO 28 to produce the transmitter LO 34. In another embodiment, the RX/TX LO module 22 includes at least one phase locked loop to produce a second oscillation from the LO 28, where each of the receiver LO 32 and transmitter LO 34 includes a buffered version of LO 28 and a buffered version of the second oscillation. In yet another embodiment, the RX/TX LO module 22 includes one or more frequency multipliers and/or frequency dividers to produce the desired frequencies for the receiver LO 32 and/or the transmitter LO 34.

Figure 4:
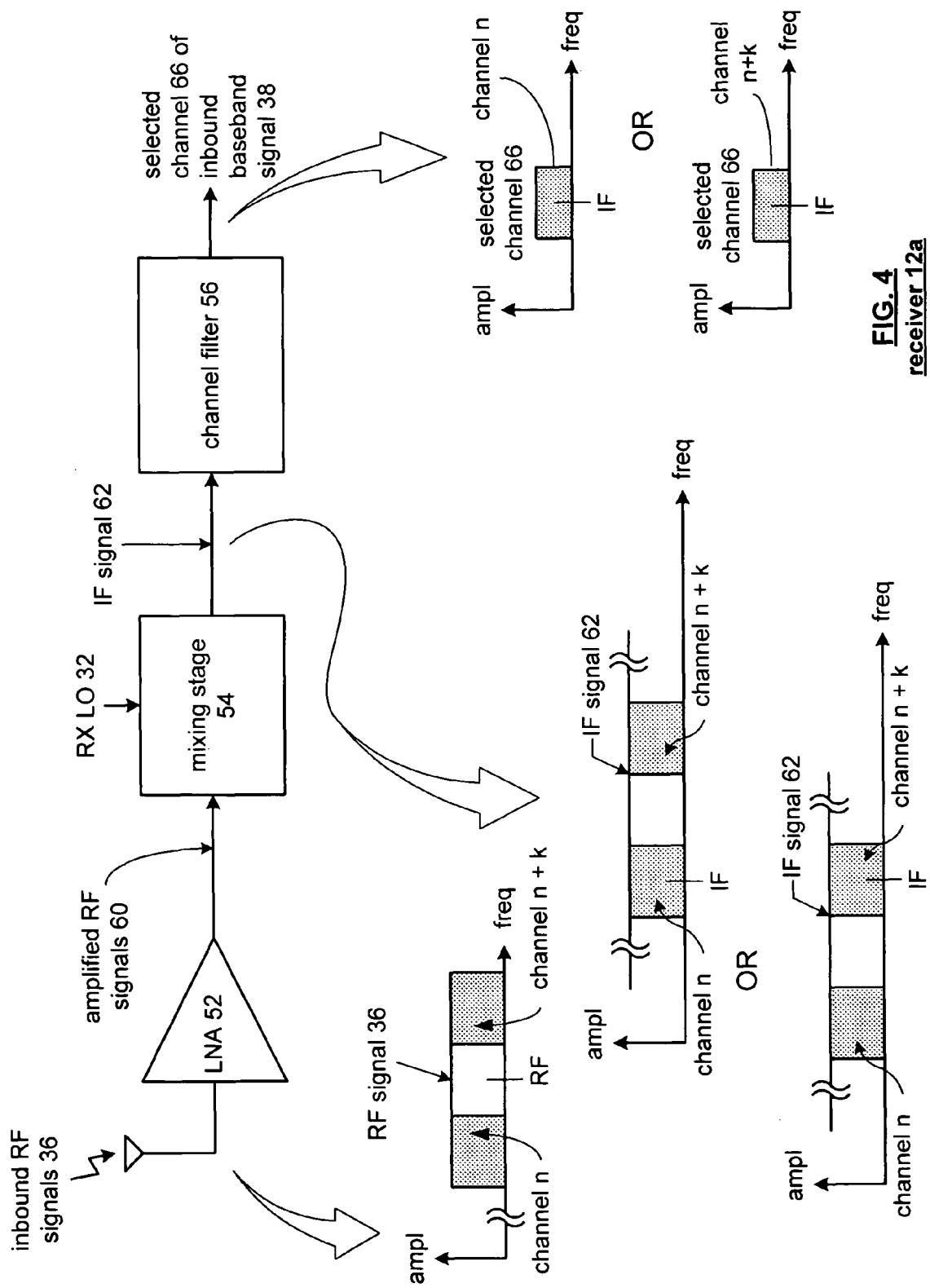
FIG. 4 is a schematic block diagram of a receiver in accordance with the present invention.

FIG. 4 is a schematic block diagram of a radio frequency (RF) receiver 12a that includes a low noise amplifier 52, a mixing stage 54 and a selectable channel filter 56. The low noise amplifier 52 is operably coupled to an antenna to receive inbound RF signals 36 and to produce amplified RF signals 60, there from. A graphical representation of the RF signals 36 is shown to include a signal having a certain bandwidth centered at the radio frequency (RF) and to include a plurality of channels (e.g., channel n, channel n+k, etc., wherein k is a real number).

The mixing stage 54 mixes the amplified RF signal 60 with the receiver local oscillation (LO) 32 to produce an intermediate frequency (IF) signal 62. The receiver LO 32 may not be equal to the carrier frequency of the RF signals 32 or it may be equal to the carrier frequency of the RF signals 36. When the frequency of the RX local oscillation 32 is equal to the carrier frequency of the RF signals 36, the receiver section 12 is performing a direct conversion. Conversely, when the frequency of the local oscillation 32 is not equal to the carrier frequency of the RF signals 36, the RF receiver section 12 is part of a super heterodyne receiver. The resulting IF signal 62 is graphically illustrated to include a plurality of channels (channel n, n+k) centered about the intermediate frequency (IF). Note that the IF signal 22 may be a complex baseband signal having an in-phase component and a quadrature component with an intermediate frequency at or near baseband.

As shown, if the RX LO 32 is derived from the $1^{st}$ LO 24, the center frequency of the IF signal 62 will correspond to channel n of the signal. Alternatively, if the RX LO 32 is derived from the $2^{nd}$ LO 24, the center frequency of the IF signal 62 will correspond to channel n+k of the signal.

The selectable channel filter 56 provides a filter response to pass a channel centered at the IF. In this example, the selectable channel filter 56 passes channel n as the selected channel when RX LO 32 was derived from the first LO 24 and passes channel n+k as the selected channel 66 when RX LO 32 is derived from the second LO 26. The selected channel 66, as at least part of the inbound baseband signal 38, is provided to a baseband processing module to recover data from the inbound baseband signal 38.

Figure 5:
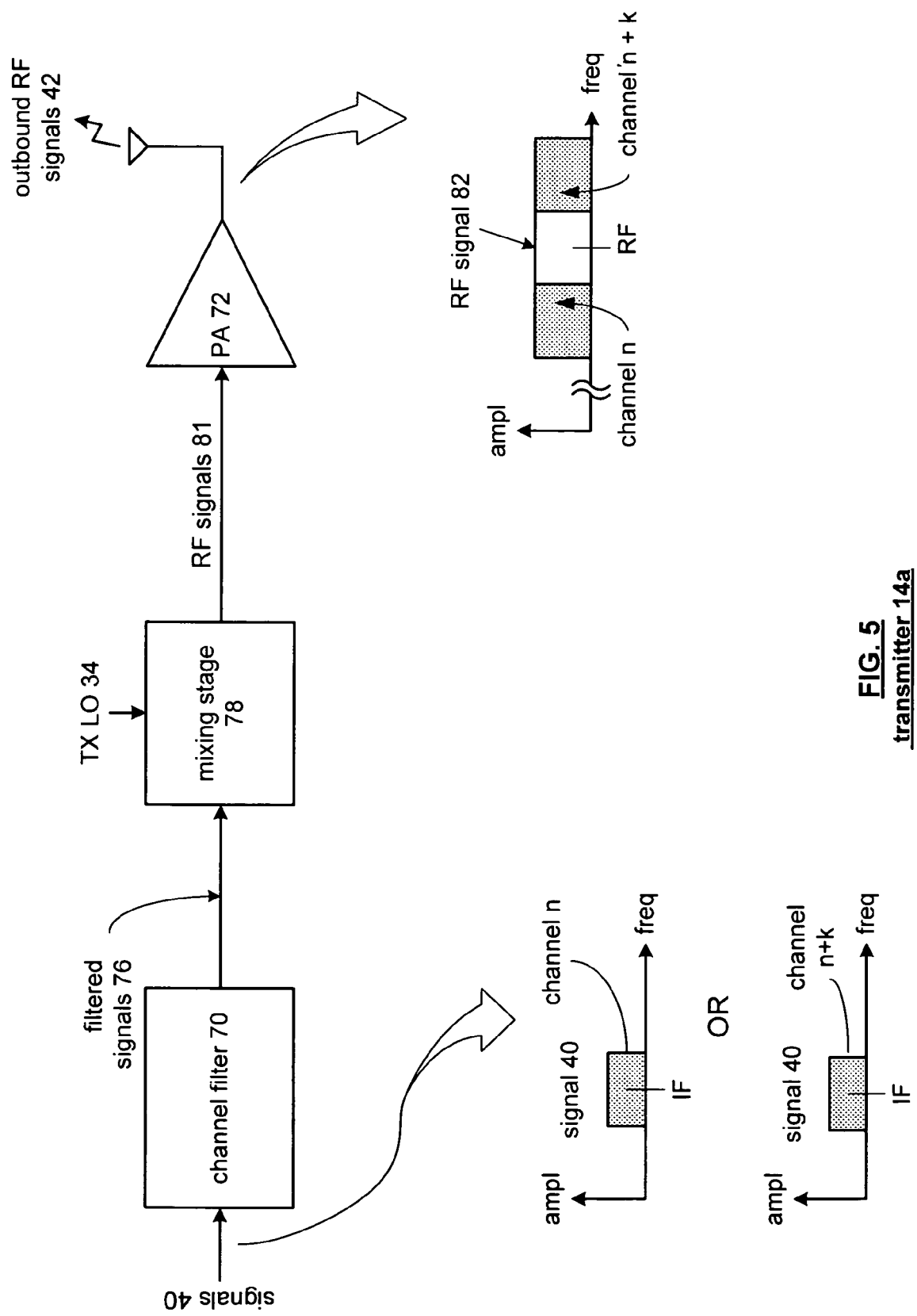
FIG. 5 is a schematic block diagram of a transmitter in accordance with the present invention.

FIG. 5 is a schematic block diagram of the RF transmitter 14a that includes a channel filter 70, a mixing stage 78 and a power amplifier 72. The channel filter 70 filters outbound signals 40 to produce filtered signals 76. In this illustration, the outbound baseband signals 40 include channel n or channel n+k. The channel filter 70 filters the outbound baseband signals 40 to produce filtered signals 76. Note that outbound baseband signal 40 may be baseband for a direct conversion transmitter or at an intermediate frequency of a super heterodyne transmitter.

The mixing stage 78 mixes the filtered signals 76 with the transmitter local oscillation 34 to produce RF signals 81. In this embodiment, when outbound baseband signal 40 includes channel n+k, TX LO 34 would be derived from the second LO 26 and when the signal 40 includes channel n, TX LO 34 would be derived from the first LO 24. The power amplifier 72 amplifies RF signals 81 to produce outbound RF signals 42, which are transmitted via the corresponding antenna.

FIG. 6 illustrates a schematic block diagram of one embodiment of the oscillation generating module 18 that includes a first phase locked loop 90 and a second phase locked loop 92. In this embodiment, the first phase locked loop 90 produces the first local oscillation 24 for a reference oscillation 94 and the second phase locked loop 92 produces the second local oscillation 26 from the reference oscillation. As one of ordinary skill in the art will appreciate, the reference oscillation 94 may be generated from a crystal oscillation circuit and the frequency of the first and second LOs 24 and 26 may be set to a value corresponding to an intermediate frequency or RF frequency of a wireless communication standard.

FIG. 7 is a schematic block diagram of another embodiment of the oscillation generating module 18 that includes a phase locked loop 90 and a modulation module 96. The modulation module 96 includes a first multiplier, a first 90° phase shift module, a second 90° phase shift module, a second multiplier, and a summation module. In this embodiment, the phase locked loop 90 generates the first LO 24 from the reference oscillation 94 and the modulation module 96 generates the second LO 26 from the first LO 24 and the reference oscillation 94.

In particular, the modulation module 96 multiplies the first LO 24 with the reference oscillation (RO) 94 via the first multiplier to produce a first resultant. For example, $\sin \omega LO1 * \sin \omega RO = \frac{1}{2} \cos(\omega LO - \omega RO) - \frac{1}{2} \cos(\omega LO + \omega RO)$. The first 90° phase shift module shifts the first LO 24 by 90 degrees to produce a cosine waveform and the second 90° phase shift module shifts the reference oscillation by 90 degrees to produce a cosine waveform. The second multiplier multiplies the cosine waveform of the first LO 24 with the cosine waveform of the reference oscillation 94 (which may be produced by passing the sine wave of the RO through a 90° phase shift module) to produce a second resultant. For example, $\cos(\omega LO) * \cos \omega RO = \frac{1}{2} \cos(\omega LO - \omega RO) + \frac{1}{2} \cos(\omega LO + \omega RO)$. The summation module subtracts the first resultant from the second resultant to produce the second LO 26. For example, $\frac{1}{2} \cos(\omega LO - \omega RO) + \frac{1}{2} \cos(\omega LO + \omega RO) - [\frac{1}{2} \cos(\omega LO - \omega RO) - \frac{1}{2} \cos(\omega LO + \omega RO)] = \cos(\omega LO + \omega RO)$. Accordingly, the second LO 26 has a frequency equal to the sum of the frequencies of the first LO 24 and the reference oscillation 94. Alternatively, the summation module may add the first and second resultants such that the second LO 26 has a frequency equal to frequency of the first LO 24 minus the frequency of the reference oscillation 94.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The preceding discussion has presented a method and apparatus for rapidly adjusting the local oscillation of a receiver and/or transmitter. As one of ordinary skill in the art will appreciate, other embodiments may be derived from the teaching of the present invention without deviating from the scope of the claims.

What is claimed is:

1. A rapidly adjustable local oscillation (LO) module in a multiple transmission path radio frequency transmitter to communicate with a plurality of clients, the rapidly adjustable LO module comprises:
    oscillation generating module operably coupled to contemporaneously generate a plurality of local oscillations, wherein each of the plurality of local oscillations has a frequency that causes a direct baseband to radio frequency conversion via heterodyne action to a corresponding plurality of carrier frequencies in common frequency band; and
    a high frequency switching module to provide one of the plurality of local oscillations at a rate sufficient to accommodate a change in communication from one client to another client of the plurality of clients, the high frequency switching module operably coupled to:
        for a first one of a plurality of transmission paths, provide one of the plurality of local oscillations when a first transmission path selection indication is in a first state and provide another one of the plurality of local oscillations when the first transmission path selection indication is in a second state; and
        for a second one of the plurality of transmission paths, provide the one of the plurality of local oscillations when a second transmission path selection indication is in a first state and provide the another one of the plurality of local oscillations when the second transmission path selection indication is in a second state.

2. The rapidly adjustable LO module of claim 1, wherein the oscillation generating module comprises:
    a first phase lock loop to produce the one of the plurality of local oscillations from a reference oscillation; and
    a second phase lock loop to produce the another one of the plurality of local oscillations from the reference oscillation.

3. The rapidly adjustable LO module of claim 1, wherein the oscillation generating module comprises:

a phase lock loop to generate the one of the plurality of local oscillations from a reference oscillation; and modulation module operably coupled to produce the another one of the plurality of location oscillations based on the one of the plurality of local oscillations and the reference oscillation.

4. The rapidly adjustable LO module of claim 3, wherein the modulation module comprises:

a first mixer operably coupled to mix to the one of the plurality of local oscillations with the reference oscillation to produce a first mixed oscillation;

a ninety degree phase shift module operably coupled to phase shift the one of the plurality of local oscillations by ninety degrees to produce a phase shifted local oscillation;

a second ninety degree phase shift module operably coupled to phase shift the reference oscillation by ninety degrees to produce a phase shifted reference oscillation;

a second mixer operably coupled to mix the phase shifted local oscillation with the phase shifted reference oscillation to produce a second mixed oscillation; and a summing module operably coupled to sum the first and second mixed oscillations to produce the another one of the plurality of local oscillations.

5. A radio frequency (RF) transceiver front-end comprises:
a transceiver section operably coupled to:
convert a plurality of inbound RF signals received via a plurality of transmission paths into a plurality of inbound baseband signals in accordance with a plurality of transceiver local oscillations; and
convert a plurality of outbound baseband signals for transmission via the plurality of transmission paths into a plurality of outbound RF signals in accordance with the plurality of transceiver local oscillations; and
oscillation generating module operably coupled to contemporaneously generate a plurality of local oscillations, wherein each of the plurality of transceiver local oscillations has a frequency that causes, via heterodyne action, one of: direct radio frequency to intermediate frequency conversion; and direct radio frequency to baseband conversion, from a corresponding plurality of carrier frequencies in common frequency band; and
a high frequency switching module to provide one of the plurality of local oscillations at a rate sufficient to accommodate a change in communication from one client to another client of a plurality of clients, the high frequency switching module operably coupled to:
for a first one of the plurality of transmission paths, derive one of the plurality of transceiver local oscillations from one of the plurality of local oscillations when a first transmission path selection indication is in a first state and derive another one of the plurality of transceiver local oscillations from another one of the plurality of local oscillations when the first transmission path selection indication is in a second state; and
for a second one of the plurality of transmission paths, derive the one of the plurality of transceiver local oscillations from the one of the plurality of local oscillations when a second transmission path selection indication is in the first state and derive the another one of the plurality of transceiver local oscillations from the another one of the plurality of local oscillations when the second transmission path selection indication is in the second state.

6. The RF transceiver front-end of claim 5, wherein the oscillation generating module comprises:

a first phase lock loop to produce the one of the plurality of local oscillations from a reference oscillation; and a second phase lock loop to produce the another one of the plurality of local oscillations from the reference oscillation.

7. The RF transceiver front-end of claim 5, wherein the oscillation generating module comprises:

a phase lock loop to generate the one of the plurality of local oscillations from a reference oscillation; and modulation module operably coupled to produce the another one of the plurality of location oscillations based on the one of the plurality of local oscillations and the reference oscillation.

8. The RF transceiver front-end of claim 7, wherein the modulation module comprises:

a first mixer operably coupled to mix to the one of the plurality of local oscillations with the reference oscillation to produce a first mixed oscillation;

a ninety degree phase shift module operably coupled to phase shift the one of the plurality of local oscillations by ninety degrees to produce a phase shifted local oscillation;

a second ninety degree phase shift module operably coupled to phase shift the reference oscillation by ninety degrees to produce a phase shifted reference oscillation;

a second mixer operably coupled to mix the phase shifted local oscillation with the phase shifted reference oscillation to produce a second mixed oscillation; and a summing module operably coupled to sum the first and second mixed oscillations to produce the another one of the plurality of local oscillations.

9. The RF transceiver front-end of claim 5, wherein the transceiver section comprises:

a receiver section operably coupled to sequentially convert the plurality of inbound RF signals received via the plurality of transmission paths into the plurality of inbound baseband signals in accordance with the plurality of transceiver local oscillations; and a transmitter section operably coupled to sequentially convert the plurality of outbound baseband signals for transmission via the plurality of transmission paths into the plurality of outbound RF signals in accordance with the plurality of transceiver local oscillations.

10. The RF transceiver front-end of claim 5, wherein the transceiver section comprises:

a plurality of receiver sections operably coupled to convert the plurality of inbound RF signals received via the plurality of transmission paths into the plurality of inbound baseband signals in accordance with the plurality of transceiver local oscillations; and a plurality of transmitter sections operably coupled to convert the plurality of outbound baseband signals for transmission via the plurality of transmission paths into the plurality of outbound RF signals in accordance with the plurality of transceiver local oscillations.

11. A radio frequency (RF) receiver front-end comprises:
a receiver section operably coupled to convert a plurality of inbound RF signals received via a plurality of transmission paths into a plurality of inbound baseband signals in accordance with a plurality of receiver local oscillations;
oscillation generating module operably coupled to contemporaneously generate a plurality of local oscillations, wherein each of the plurality of local oscillations has a frequency that causes via heterodyne action, one of: direct radio frequency to intermediate frequency conversion; and direct radio frequency to baseband conversion from a corresponding plurality of carrier frequencies in common frequency band; and a high frequency switching module to provide one of the plurality of local oscillations at a rate sufficient to accommodate a change in communication from one client to another client of a plurality of clients, the high frequency switching module operably coupled to:

for a first one of the plurality of transmission paths, derive one of the plurality of receiver local oscillations from one of the plurality of local oscillations when a first transmission path selection indication is in a first state and derive another one of the plurality of receiver local oscillations from another one of the plurality of local oscillations when the first transmission path selection indication is in a second state; and for a second one of the plurality of transmission paths, derive the one of the plurality of receiver local oscillations from the one of the plurality of local oscillations when a second transmission path selection indication is in the first state and derive the another one of the plurality of receiver local oscillations from the another one of the plurality of local oscillations when the second transmission path selection indication is in the second state.

12. The RF receiver front-end of claim 11, wherein the oscillation generating module comprises:
a first phase lock loop to produce the one of the plurality of local oscillations from a reference oscillation; and
a second phase lock loop to produce the another one of the plurality of local oscillations from the reference oscillation.

13. The RF receiver front-end of claim 11, wherein the oscillation generating module comprises:
a phase lock loop to generate the one of the plurality of local oscillations from a reference oscillation; and
modulation module operably coupled to produce the another one of the plurality of location oscillations based on the one of the plurality of local oscillations and the reference oscillation.

14. The RF receiver front-end of claim 13, wherein the modulation module comprises:
a first mixer operably coupled to mix to the one of the plurality of local oscillations with the reference oscillation to produce a first mixed oscillation;
a ninety degree phase shift module operably coupled to phase shift the one of the plurality of local oscillations by ninety degrees to produce a phase shifted local oscillation;
a second ninety degree phase shift module operably coupled to phase shift the reference oscillation by ninety degrees to produce a phase shifted reference oscillation;
a second mixer operably coupled to mix the phase shifted local oscillation with the phase shifted reference oscillation to produce a second mixed oscillation; and
a summing module operably coupled to sum the first and second mixed oscillations to produce the another one of the plurality of local oscillations.

15. The RF receiver front-end of claim 11, wherein the receiver section functions to:
sequentially convert the plurality of inbound RF signals received via the plurality of transmission paths into the plurality of inbound baseband signals in accordance with the plurality of transceiver local oscillations.

16. The RF receiver front-end of claim 11, wherein the receiver section comprises:
a plurality of receiver sections operably coupled to convert the plurality of inbound RF signals received via the plurality of transmission paths into the plurality of inbound baseband signals in accordance with the plurality of transceiver local oscillations.

17. A radio frequency (RF) transmitter front-end comprises:
a transmitter section operably coupled to convert a plurality of outbound baseband signals for transmission via a plurality of transmission paths into a plurality of outbound RF signals in accordance with a plurality of transmitter local oscillations;
oscillation generating module operably coupled to contemporaneously
generate a plurality of local oscillations, wherein each of the plurality of local oscillations has a frequency that causes direct baseband to radio frequency conversion via heterodyne action to a corresponding plurality of carrier frequencies in common frequency band; and
a high frequency switching module to provide one of the plurality of local oscillations at a rate sufficient to accommodate a change in communication from one client to another client of a plurality of clients, the high frequency switching module operably coupled to:
for a first one of the plurality of transmission paths, derive one of the plurality of transmitter local oscillations from one of the plurality of local oscillations when a first transmission path selection indication is in a first state and derive another one of the plurality of transmitter local oscillations from another one of the plurality of local oscillations when the first transmission path selection indication is in a second state; and
for a second one of the plurality of transmission paths, derive the one of the plurality of transmitter local oscillations from the one of the plurality of local oscillations when a second transmission path selection indication is in the first state and derive the another one of the plurality of transmitter local oscillations from the another one of the plurality of local oscillations when the second transmission path selection indication is in the second state.

18. The RF transmitter front-end of claim 17, wherein the oscillation generating module comprises:
a first phase lock loop to produce the one of the plurality of local oscillations from a reference oscillation; and
a second phase lock loop to produce the another one of the plurality of local oscillations from the reference oscillation.

19. The RF transmitter front-end of claim 17, wherein the oscillation generating module comprises:
a phase lock loop to generate the one of the plurality of local oscillations from a reference oscillation; and
modulation module operably coupled to produce the another one of the plurality of location oscillations based on the one of the plurality of local oscillations and the reference oscillation.

20. The RF transmitter front-end of claim 19, wherein the modulation module comprises:
a first mixer operably coupled to mix to the one of the plurality of local oscillations with the reference oscillation to produce a first mixed oscillation;
a ninety degree phase shift module operably coupled to phase shift the one of the plurality of local oscillations by ninety degrees to produce a phase shifted local oscillation;
a second ninety degree phase shift module operably coupled to phase shift the reference oscillation by ninety degrees to produce a phase shifted reference oscillation;

a second mixer operably coupled to mix the phase shifted local oscillation with the phase shifted reference oscillation to produce a second mixed oscillation; and a summing module operably coupled to sum the first and second mixed oscillations to produce the another one of the plurality of local oscillations.

21. The RF transmitter front-end of claim 17, wherein the transmitter section functions to:

sequentially convert the plurality of outbound baseband signals for transmission via the plurality of transmission paths into the plurality of outbound RF signals in accordance with the plurality of transceiver local oscillations.

22. The RF transmitter front-end of claim 17, wherein the transmitter section comprises:

a plurality of transmitter sections operably coupled to convert the plurality of outbound baseband signals for transmission via the plurality of transmission paths into the plurality of outbound RF signals in accordance with the plurality of transceiver local oscillations.

* * * * *